UNITED STATES PATENT OFFICE.

TOYOYORY HARA, OF SAN FRANCISCO, CALIFORNIA.

METHOD OF DESICCATING EGGS.

1,100,973.    Specification of Letters Patent.    Patented June 23, 1914.

No Drawing.    Application filed June 23, 1913. Serial No. 775,395.

*To all whom it may concern:*

Be it known that I, TOYOYORY HARA, a subject of the Emperor of Japan, residing in the city and county of San Francisco and State of California, have invented new and useful Improvements in Methods of Desiccating Eggs, of which the following is a specification.

This invention relates to a method of desiccating eggs.

It is the purpose of this invention to improve present methods of desiccating eggs so as to produce a superior product of uniform character and without destroying or changing the chemical constituents of the egg, other than the evaporation of the moisture therein; and to provide a method of manufacturing egg powder by which the addition of chemicals for preserving or coloring is rendered unnecessary.

Heretofore it has been a common practice in reducing eggs to a powder or flake state, to add preservatives such as sugar, salt, sulfid of soda, or other foreign chemical substances to prevent the product from becoming rancid and disagreeable to the taste, coloring matter also being employed to render the product uniform in color. This addition of foreign substances changes the chemical constituents of the egg powder, renders it impure, and is therefore objectionable.

By my improved process of treating and handling the egg in the desiccating process, the addition of preservatives or coloring matter is rendered unnecessary; furthermore, by desiccating the egg by my improved method chemical changes in the constituents of the egg, other than evaporation of moisture, are prevented, thus producing a product which is pure and when mixed with the proper proportion of water possesses all the qualities of the egg in its original state.

The essence of my present process resides in handling and treating the egg in a dark room, in a pure, dry atmosphere warmed to a predetermined temperature, so as to prevent the chemical action of sunlight and humid air on the constituents of the egg, it having been found that both the yolk and white of the egg are sensitive to and affected by light rays, particularly those of the sun, and other white or yellow light, and also detrimentally affected by exposure to impure and moist atmosphere.

In carrying out the present process the eggs are broken in a dark room and the yolks and whites are separated in a red or ruby light, so as not to expose the egg liquid to white light. The yolk and white portions of the egg are then thoroughly beaten in separate vessels, so as to render them uniform in consistency. The beaten yolks and whites are then mixed and again beaten so as to thoroughly mingle the yolk and white portions of the eggs into one mass of uniform consistency, to which is added approximately 1½% of warmed, distilled water, and then thoroughly beaten, which acts to reduce the mass to a more liquid and less viscous state. The foregoing steps are, as before stated, carried on in a dark room having a temperature of not less than 105° Fahrenheit, or more than 115° F.; the temperature being preferably maintained at 105° F., it having been found that by treating eggs, as before described, in this temperature, no chemical action or change in the constituents of the egg takes place. When the egg liquid has been thoroughly beaten, it is distributed in a thin film over a surface of glass, china, porcelain, or similar ware, heated to a temperature of approximately 5° more than that of the surrounding atmosphere, that is about 110° F., when the temperature of the room is maintained at 105° F. until the mass is reduced to a powder or flake state.

It has been found that by the addition of distilled water, the evaporation of the moisture from the egg liquid is greatly quickened, and that by beating the yolks and whites of the eggs in separate vessels, then mixing and rebeating the yolk and white portions of the egg become thoroughly mixed and do not separate readily into separate strata owing to the difference in specific gravity of the yolks and whites, when distributed over the drying plates. This insures a product of uniform character and color.

It is necessary that the atmosphere of the room in which the eggs are treated be pure and kept dry and free from moisture, for which reason the air is treated in any suitable manner to purify it and remove the moisture before it is allowed to enter the room. The absence of humidity in the air in which the egg liquid is handled prevents chemical changes taking place in the egg liquid, due to atmospheric moisture.

It is important that the egg liquid be evaporated or dried in a short space of time; the more rapidly the drying action takes place the better, as delay in the drying causes detrimental chemical changes to take place in the egg liquid. The quickness of the drying operation is facilitated and insured by treating the egg liquid in a dry atmosphere of the temperature above specified, and also by the addition of distilled water which insures a rapid spreading of the liquid over the surface of the drying plates.

Having thus described my invention, what I claim and desire to secure by Letters Patent, is:

1. The method of desiccating eggs, consisting in separating the yolks from the whites of the eggs, beating the whites and yolks separately, mixing the yolks and whites together in the beaten state and rebeating, and finally in reducing the mass to a powder or flake state by pouring the mass in a thin layer over non-metallic drying plates heated to a temperature of about 110° F.; the above operations being performed in a dark room in which the atmosphere is dehumidified and heated to a temperature of about 5° less than the drying plates.

2. The method of desiccating eggs, consisting in separating the yolks from the whites of the eggs, beating the whites and yolks separately, mixing the yolks and whites together in the beaten state and rebeating, adding about $1\frac{1}{2}\%$ distilled water and again beating, and finally in reducing the mass to a powder or flake state by pouring the mass in a thin layer over non-metallic drying plates heated to a temperature of about 110° F.; the above operations being performed in a dark room in which the atmosphere is dehumidified and heated to a temperature of about 5° less than the drying plates.

3. The method of desiccating eggs, consisting in breaking and beating the eggs in a dark room, adding about $1\frac{1}{2}\%$ of distilled water, beating the egg liquid and and water, and drying the mass on heated plates in a dry atmosphere of about 105° F. until the mass is in a powder or flake state.

In testimony whereof I have hereunto set my hand in the presence of two subscribing witnesses.

TOYOYORY HARA.

Witnesses:
JOHN H. HERRING,
W. W. HEALEY.